US011382281B2

(12) United States Patent
Ohno et al.

(10) Patent No.: US 11,382,281 B2
(45) Date of Patent: Jul. 12, 2022

(54) PLANT ACTIVATOR AND A METHOD OF MANUFACTURING THE SAME (71) Applicant: IBIDEN CO., LTD., Gifu (JP)

(72) Inventors: Katsuya Ohno, Gifu (JP); Kumiko Takada, Gifu (JP); Tomohiro Nohara, Gifu (JP); Teruaki Yokota, Gifu (JP); Kenta Uemura, Gifu (JP); Hiroko Takagi, Gifu (JP); Toru Nakai, Gifu (JP)

(73) Assignee: IBIDEN CO., LTD., Gifu (JP)

( * ) Notice: Subject to any disclaimer, the term of this patent is extended or adjusted under 35 U.S.C. 154(b) by 541 days.

(21) Appl. No.: 16/331,300

(22) PCT Filed: Sep. 7, 2017

(86) PCT No.: PCT/JP2017/032354
§ 371 (c)(1),
(2) Date: Mar. 7, 2019

(87) PCT Pub. No.: WO2018/047918
PCT Pub. Date: Mar. 15, 2018

(65) Prior Publication Data
US 2020/0060100 A1 Feb. 27, 2020

(30) Foreign Application Priority Data
Sep. 8, 2016 (JP) .............................. JP2016-175861

(51) Int. Cl.
A01G 7/06 (2006.01)
A01N 63/50 (2020.01)
A01N 63/20 (2020.01)
(52) U.S. Cl.
CPC .............. A01G 7/06 (2013.01); A01N 63/20 (2020.01); A01N 63/50 (2020.01)

(58) Field of Classification Search
None
See application file for complete search history.

(56) References Cited

U.S. PATENT DOCUMENTS 5,900,236 A 5/1999 Gerhardson et al.
8,318,638 B2 11/2012 Yokoyama et al.
(Continued)

FOREIGN PATENT DOCUMENTS

CN 101167480 4/2008
CN 104178537 12/2014
(Continued)

OTHER PUBLICATIONS

Translation of the International Preliminary Report on Patentability dated Mar. 21, 2019, International Application No. PCT/JP2017/032354, 6 pages.
(Continued)

Primary Examiner — Alton N Pryor
(74) Attorney, Agent, or Firm — Ware, Fressola, Maguire & Barber LLP (57) ABSTRACT The objective of the invention is to provide a plant activator with superior resistance-inducing activity and growth promoting activity and low toxicity and soil contamination. A plant activator comprising a fatty acid metabolite obtainable by a metabolism of a fatty acid with 4 to 30 carbon atoms by a proteobacteria under a dissolved oxygen concentration of 0.1-8 mg/L, and a method for manufacturing a plant activator comprising a fatty acid metabolite, comprising a step for fatty acid metabolism wherein a fatty acid with 4 to 30 carbon atoms is subjected to a proteobacterial metabolization under a dissolved oxygen concentration of 0.1-8 mg/L. A method for manufacturing a plant activator comprising a fatty acid metabolite, comprising a step for fatty acid metabolism wherein a fatty acid with 4 to 30 carbon atoms is subjected to a proteobacterial metabolization under a dissolved oxygen concentration of 0.1-8 mg/L. A method for manufacturing a plant activator comprising a fatty acid metabolite, comprising a step for fatty acid metabolism wherein a fatty acid with 4 to 30 carbon (Continued)

atoms is subjected to a proteobacterial metabolization under a dissolved oxygen concentration of 0.1-8 mg/L.

16 Claims, 5 Drawing Sheets

(56) References Cited

U.S. PATENT DOCUMENTS

| | | | |
|---|---|---|---|
| 2011/0152101 A1 | 6/2011 | Yokoyama et al. | |
| 2011/0262416 A1 | 10/2011 | Cho et al. | |
| 2019/0309248 A1* | 10/2019 | Alibek | A01N 63/32 |

FOREIGN PATENT DOCUMENTS

| | | |
|---|---|---|
| EP | 1 210 878 | 6/2002 |
| ES | 2161146 A1 | 11/2001 |
| JP | H03-220108 A | 9/1991 |
| JP | H06-80530 A | 3/1994 |
| JP | H06-305921 | 11/1994 |
| JP | H07-48218 A | 2/1995 |
| JP | 9-132509 | 5/1997 |
| JP | H10-502803 A | 3/1998 |
| JP | 2001-131006 | 5/2001 |
| JP | 2007-530032 A | 11/2007 |
| WO | 98/51155 A1 | 11/1998 |

OTHER PUBLICATIONS

International Search Report dated Oct. 31, 2017, International Application No. PCT/JP2017/032354, 2 pages.
English Abstract, CN104178537, 1 page.
"The Effect of Plant Growth Promoting Rhizobacteria (PGPR) on Germination, Seedling Growth and Yield of Maize" by A. Gholami et al., International Journal of Agricultural and Biosystems Engineering, vol. 3, No. 1, 2009, pp. 9-14.
English Abstract, JP H09-132509, 1 page.
Result list Patent Family Search, JP2001-131006, showing Foreign Cite No. 6 above, as well as US Pat. as family members, 1 page.
English Abstract, JPH06-305921, 1 page.
Machine translation of claims of CN101167480A, 3 pages.
Machine translation of description of CN101167480A, 9 pages.
English Abstract, JP2001131006A, 1 page.
Extended European Search Report from EP App. No. 17848856.5, dated Mar. 10, 2020 (10 pages).
Office Action from Indian Patent Application No. 201917009245, dated May 31, 2021 (7 pages).
Office Action from Japanese Patent Application No. 2018-538473 and English Translation, dated Dec. 24, 2019 (11 pages).
Office Action from Japanese Patent Application No. 2020-074163 and English Translation, dated Oct. 12, 2021 (10 pages).
Office Action from Chinese Patent Application No. 201780054954.2 and English Translation, dated Sep. 3, 2020 (13 pages).
Office Action from Chinese Patent Application No. 201780054954.2 and English Translation, dated Mar. 19, 2021 (12 pages).
Office Action from Chinese Patent Application No. 201780054954.2 and English Translation, dated Jul. 21, 2021 (15 pages).
Koma, et al., "Do You Understand the Medium Component?" Biotechnology, vol. 89, No. 4, p. 195-199, 2011 (5 pages).
Arai, et al., "Studies on the Fatty Acids in Culture Media (I) The Growth-stimulating Action of Fatty Acids in Vitamin-free Casein Digests for *Streptococcus hemolyticus* Strain S8", Nihon Sangyo Journal, vol. 17, No. 1, p. 48-53, Aug. 1968 (6 pages).
Kobayashi, "Basics of Medium-mechanism and specifications", May 2003 (3 pages).
Tsukamoto, "On the oxidation of fatty acids by purple bacteria," 62 BOT. MAG. Tokyo 159-167, Nov. 1949, (9 pages).
Silliker et al. "Studies on the Aerobic Oxidation of Fatty Acids by Bacteria", 61 J. Bacteriology 653-659, https://jb.asm.org/content/jb/61/6/653,full.pdf, Feb. 24, 1951 (7 pages).
Nie et al., "A Novel Paradigm of Fatty Acid [beta]-Oxidation Exemplified by Thioesterase-Dependent Partial Degradation of Conjugated Linoleic Acid That Fully Supports Growth of *Escherichia coli*", 47 Biochemistry 9618, Aug. 15, 2008 (9 pages).
Kuo, et al., "Fatty Acid Bioconversions by *Pseudomonas aeruginosa* PR3", 75 Journal of the American Oil Chemists' Society 875-879, Jan. 1998 (5 pages).
Kutty, "Chemicals Features of Water, Dissolved Oxygen", Mar. 1, 1987, https://www.fao.org/3/AC183E/AC183E04.htm (9 pages).
Furuya et al., "Antimicrobial Activities of Pseudomonads against Plant Pathogenic Organisms and Efficacy of Pseudomonas aeruginosa ATCC7700 against Bacterial Wilt of Tomato," 63 Ann. Phytopathol. Soc. Jpn. 417-424, Dec. 1997 (8 pages).
Shikai, "Tobacco Habits", Yunan Science Press, p. 114, Aug. 31, 2011 (2 pages).
Wang, "Bacteria," Beijing United Publishing Company, pp. 85-87, Oct. 31, 2013 (4 pages).
Zhiqiong et al., p. 24, "Bacterial Diseases of Tropical Plants," Hainan Press, Feb. 1, 2009 (2 pages).

* cited by examiner

FIG. 1

(formerly Table 1 in the specification)

| | | agent for treatment | disease symptoms | | | prevention effect |
|---|---|---|---|---|---|---|
| | | | entire picture | magnified picture | evaluation | |
| Example | 1 | plant activator for test |  |  | no disease symptoms | ◎ |
| Comparative example | 1 | water |  |  | necrosis, discoloration | × |
| | 2 | pyroligneous acid |  |  | necrosis, discoloration | × |
| | 3 | aqueous sorbitan fatty acid solution |  |  | partial necrosis, discoloration | △ |
| | 4 | potassium carbonate + polyoxyethylene nonylphenylether |  |  | necrosis, discoloration | × |
| | 5 | tetrachloroisophthalonitrile aqueous solution |  |  | no disease symptoms | ◎ |

PLANT ACTIVATOR AND A METHOD OF MANUFACTURING THE SAME

TECHNICAL FIELD

The present invention relates to a plant activator and a method of manufacturing the same.

BACKGROUND ART

For the purpose of promoting the plant growth, some measures, such as an optimization of temperature conditions or daylight conditions, or a fertilization, have been implemented for a long time. However, those measures have their limitations. For example, increasing an amount of a fertilizer to be used for a fertilization neither provides a further desirable growth-promoting effect beyond a certain level, nor, applying too much fertilizer would cause a plant growth disorder and may result in a contamination of the soil.

Therefore, in addition to those measures, there has been some reports including a growth promotion using a plant activator having, for example, a plant growth control activity such as growth promotion (which refers to the concept that includes an enlargement of leaves and stems and a growth promotion of tubers and tuberous roots), sleep suppression, imparting a stress resistance to plant, and anti-aging. Reference 1 describes a plant activator comprising a ketol fatty acid with 4 to 24 carbon atoms as an active ingredient.

Meanwhile, the plant disease and insect pest control depends largely on synthesized agrochemicals, however, in view of the soil contamination as well as human health damage, reducing the amount of the agrochemical to be used has been required.

Some measures using a disease resistance inducing agent are known as a method for controlling a plant disease or pests to protect plants without using agrochemicals. Examples of resistance inducing agents include, for example, probenazole, isotianil, acibenzolar-S-methyl (ASM), 3'-chloro-4,4'-dimethyl-1,2,3-thiadiazole-5-carboxianilide (tiadinil), and Validamycin.

PRIOR ART DOCUMENT

Patent Document

Patent Document 1: JP 2001-131006 A
Patent Document 2: JP H6-305921 A

SUMMARY OF THE INVENTION

Problem to be Solved by the Invention

The effect of the plant activator disclosed in Patent Document 1 is still not enough, and the plant activator having a better activation effect is in need. Also, the conventional resistance-inducing agents are chemically synthesized, so that their toxicities are extremely high. Aforementioned agents including probenazole, isotianil, acibenzolar-S-methyl (ASM), 3'-chloro-4,4'-dimethyl-1,2,3-thiadiazole-5-carboxianilide (tiadinil) may induce the systemic acquired resistance that is activated through the salicylic acid and induced by the exposure to elicitors such as pathogenic bacteria and viruses (salicylic acid mediated signaling pathway), but does not induce the resistance to be activated thorough the jasmonic acid (and ethylene) that is synthesized in response to insect herbivory or insect injury (jasmonate mediated signaling pathway). Validamycin has been reported to be effective against wilt disease in solanaceous plants, however, the use of Validamycin in tomatoes has, as an exception, the problem that it could cause phytotoxic damage, and thus it should not be used for tomatoes. Patent Document 2 discloses the use of chemically synthesized linoleic acid peroxide as a plant growth regulator, however, it did not exhibit enough efficacy in preventing disease damage.

It has been known that the fatty acid oxide including a peroxylipid exhibits antibacterial activity. It has also been known that a jasmonic acid, for example, is biosynthezised in plants from fatty acid such as linolenic acid. However, it is not known that metabolites from fatty acid oxidation by microbial metabolization process have resistance-inducing activity.

Further those resistance-inducing agents and peroxylipids are only very slightly water soluble, and thus, one would normally have to use strong emulsifiers or dispersants when using them for treatment.

In view of such problems described above, it is the intention of the present invention to provide a plant activator having superior resistance-inducing activity and growth-promoting activity and low toxicity and soil contamination and to provide a manufacturing method thereof.

Means to Solve the Problem

The present invention relates to a plant activator comprising a fatty acid metabolite obtainable by a metabolism of a fatty acid with 4 to 30 carbon atoms by a proteobacteria under a dissolved oxygen concentration of 0.1 to 8 mg/L.

It may be preferable for the plant activator that the fatty acid is a liquid fatty acid at a temperature of 20° C.

It may be preferable for the plant activator that the proteobacteria is a proteobacteria that has been pre-cultured to $1 \times 10^8$ to $9 \times 10^{10}$ cells/mL.

It may be preferable for the plant activator that the metabolism is a metabolism in the presence of at least one type of mineral selected from Mg, P, Na and K.

It may be preferable that the plant activator comprises a biosurfactant.

It may be preferable for the plant activator that the metabolism is a metabolism under a condition of temperature from 10 to 40° C.

It may be preferable that the plant activator serves as a resistance-inducing agent.

It may be preferable that the plant activator serves as a prophylactic agent for a wilt disease in solanaceous plants.

Further the present invention relates to a method for manufacturing a plant activator comprising a fatty acid metabolite, comprising a step for fatty acid metabolism wherein a fatty acid with 4 to 30 carbon atoms is subjected to a proteobacterial metabolization under a dissolved oxygen concentration of 0.1 to 8 mg/L.

It may be preferable for the method for manufacturing a plant activator that the fatty acid is liquid at a temperature of 20° C.

It may be preferable for the method for manufacturing a plant activator that the proteobacteria has been pre-cultured to $1 \times 10^8$ to $9 \times 10^{10}$ cells/mL.

It may be preferable that the method for manufacturing a plant activator comprises the step for fatty acid metabolism performed in the presence of at least one type of mineral selected from Mg, P, Na and K.

It may be preferable for the method for manufacturing a plant activator that the plant activator comprises a biosurfactant.

It may be preferable that the method for manufacturing a plant activator comprises the step for fatty acid metabolism performed under a condition of temperature from 10 to 40° C.

It may be preferable for the method for manufacturing a plant activator that the plant activator serves as a resistance-inducing agent.

It may be preferable for the method for manufacturing a plant activator that the plant activator serves as a prophylactic agent for a wilt disease in solanaceous plants.

Effects of the Invention

The plant activator of the present invention has superior resistance-inducing activity and growth promoting activity and low toxicity and soil contamination. Further, according to the method for manufacturing a plant activator of the present invention, the plant activator having superior resistance-inducing activity and growth promoting activity and low toxicity and soil contamination can be produced.

EMBODIMENT FOR CARRYING OUT THE INVENTION

Plant Activator

A plant activator of the present invention is characterized in that it comprises a fatty acid metabolite obtainable by a metabolism of a fatty acid with 4 to 30 carbon atoms by a proteobacteria under a dissolved oxygen concentration of 0.1 to 8 mg/L.

A fatty acid metabolite of the present invention can render plants resistance and promote plant growth by being sprayed or applied to a plant root, stem or leaf. This may be because the fatty acid metabolite includes a substance or a precursor of the substance that activates the salicylic acid mediated signaling pathway or jasmonate mediated signaling pathway associated with resistance induction. Further, the fatty acid metabolite may also include a substance that activates plant growth, given that plant growth-promoting effect can be seen.

A metabolism in the context of the present invention involves performing a decomposition or synthesis using a fatty acid with 4 to 30 carbon atoms as a starting material by, for example, enzymes secreted via an endocrine or exocrine pathway by proteobacteria under a predetermined dissolved oxygen concentration. Examples include a method for culturing the proteobacteria in a culture media including the fatty acid in the context of the present invention under a predetermined dissolved oxygen concentration.

The number of carbon atoms in the fatty acid to be used in the present invention is from 4 to 30, preferably 10 to 20. When the number of carbon atoms is less than 4, the melting point and/or boiling point of the fatty acid is low, so that it tends to become highly volatile at a culture temperature and can hardly remain in the culture media. When the number of carbon atoms is more than 30, the melting point and/or boiling point of the fatty acid is high, so that it tends to become a solid at a culture temperature and cannot be mixed with a culture media, resulting in the separation of the fatty acid from the culture media. However, it should be noted that the melting point of the fatty acid does not always depend on only the number of carbon atoms based on the number of hydrogen bonds.

The fatty acid to be used in the present invention is preferably a liquid fatty acid at a temperature from 20 to 30° C. in terms of their metabolism efficiency as well as to prevent solidification in the culture media.

The fatty acid in the context of the present invention may be either a saturated fatty acid or a unsaturated fatty acid, or a mixture including both fatty acids. Further a vegetable oil, a triglyceride form, or a free fatty acid may be used. Preferably, the fatty acid is a free fatty acid (monocarboxylic acid) in terms of its superior decomposition rate.

Exemplary examples of free fatty acid with 4 to 30 carbon atoms include for instance, butanoic acid (butyric acid), pentanoic acid (valeric acid), caproic acid, enanthic acid (heptylic acid), caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, α-linolenic acid, γ-linolenic acid, eleostearic acid, arachidic acid, mead acid, arachidonic acid, behenic acid, lignoceric acid, nervonic acid, cerotic acid, montanic acid, and melissic acid. Preferably, the fatty acid is a fatty acid which has 10 to 20 carbon atoms such as capric acid, lauric acid, myristic acid, pentadecylic acid, palmitic acid, palmitoleic acid, margaric acid, stearic acid, oleic acid, vaccenic acid, linoleic acid, α-linolenic acid, γ-linolenic acid, eleostearic acid, arachidic acid, mead acid, or arachidonic acid. More preferably, the fatty acid is a fatty acid which has 18 carbon atoms such as oleic acid, linoleic acid, α-linolenic acid, or γ-linolenic acid.

Preferably, a fatty acid content in the culture media is 100 g/L or less, more preferably 60 g/L or less, still more preferably 12 g/L or less when the culture media containing the fatty acid is used. When the fatty acid content is over 100 g/L, emulsification of the fatty acid with water in the culture media may become difficult, deteriorating metabolism efficiency or resulting in an inhibition of proteobacteria growth. Further, although the lower limit of the fatty acid content is not particularly limited, the fatty acid content is preferably 1.0 g/L or more.

Preferably, the culture media containing a fatty acid in the context of the present invention also contains a mineral component. Exemplary examples of mineral components include for instance, but not particularly limited to, a mineral component which is used for culturing microorganism. Examples include for instance a component containing magnesium (Mg), phosphorous (P), sodium (Na), or potassium (K). These components can be used alone or in combination. A mineral component content in the culture media is not particularly limited, and can be adapted to the content used with a conventional method for culturing an aerobic bacteria.

A proteobacteria which can be used in the context of the present invention is not particularly limited unless it provides a desirable effect of the present invention. Preferably, the proteobacteria is a proteobacteria which has a suitable growth temperature (an optimum temperature) of from 10 to 40° C., more preferably 20 to 30° C. in terms of its fatty acid metabolism efficiency as well as growth efficiency.

Preferably, a proteobacteria in the context of the present invention is a pre-cultured proteobacteria, preferably, to the cell concentration at the end of pre-culture of $1\times10^8$ to $9\times10^{10}$ cells/mL, in such case the proteobacteria can have superior fatty acid metabolism efficiency.

With the context of the present invention a dissolved oxygen concentration during metabolism is 0.1 mg/L or more. When the dissolved oxygen concentration is less than 0.1 mg/L, the proteobacteria activity tends to become low, resulting in a significantly low fatty acid metabolism efficiency. Preferably, the dissolved oxygen concentration is 8 mg/L or less, more preferably 5 mg/L or less, still more preferably 3 mg/L or less. When the dissolved oxygen concentration is over 8 mg/L, the fatty acid tends to be oxidized by oxygen in the culture media, resulting in the reduced plant activation activity. In this context, dissolved oxygen levels are values detected by using PO electrodes by a diaphragm galvanic electrode method or diaphragm polarographic method using a dissolved oxygen meter from HORIBA, Ltd.

The temperature during metabolism can be adapted suitably according to the proteobacteria to be used, and is preferably from 10 to 40° C., more preferably from 20 to 30° C. in terms of fatty acid metabolism efficiency.

Preferably, in terms of the fatty acid metabolism efficiency and the handleability, the plant activator of the present invention includes a biosurfactant in addition to the fatty acid metabolite, so that the fatty acid as well as the fatty acid metabolite becomes water soluble. In this context, the biosurfactant according to the present invention is a surfactant produced by proteobacteria.

The plant activator of the present invention is significantly effective as a resistance-inducing agent and growth promoting agent with a low toxicity and soil contamination. The plant activator of the present invention is particularly effective as a resistance-inducing agent compared to the conventional resistance-inducing agents in that the plant activator of the present invention can activate both of respective resistance inductions through a salicylic acid mediated signaling pathway and through a jasmonate mediated signaling pathway. Further, the plant activator of the present invention can activate a resistance induction and plant growth in all parts of the plant by being applied to a part of the plant root, stem or leaf.

While, as described above, Validamycin, which is known as a resistance-inducing agent against wilt disease in solanaceous plants, should not be used in tomatoes, as an exception, because it could cause phytotoxic damage, the plant activator of the present invention can exhibit a resistance-inducing effect even on the wilt disease in tomatoes without causing any phytotoxic damages.

The plant activator of the present invention can be widely applied to the plants, regardless of their species. Examples of the plants include dicotyledonous plants of Cucurbitaceae family or Solanaceae family, and monocotyledonous plants of Gramineae family. Further, Methods for application includes, for example, a method of applying or spraying to, for example, a plant root, stem or leaf, and a method of spraying on the soil or watering.

Manufacturing Method

A method for manufacturing a plant activator containing a fatty acid metabolite of the present invention is characterized in that it comprises a step for fatty acid metabolism wherein a fatty acid with 4 to 30 carbon atoms is subjected to a proteobacterial metabolization under a dissolved oxygen concentration of 0.1 to 8 mg/L.

The step for fatty acid metabolism in the context of the present invention is a step wherein a decomposition or synthesis is performed using a fatty acid with 4 to 30 carbon atoms as a starting material by, for example, enzymes secreted via an endocrine or exocrine pathway by proteobacteria under a predetermined dissolved oxygen concentration. Examples include a method for culturing the proteobacteria in a culture media including the fatty acid in the context of the present invention under a predetermined dissolved oxygen concentration.

The dissolved oxygen concentration during metabolism in the step for fatty acid metabolism in the context of the present invention is 0.1 mg/L or more. When the dissolved oxygen concentration is less than 0.1 mg/L, the proteobacteria activity tends to become low, resulting in a significantly low fatty acid metabolism efficiency. Preferably, the dissolved oxygen concentration is 8 mg/L or less, more preferably 5 mg/L or less, still more preferably 3 mg/L or less. When the dissolved oxygen concentration is over 8 mg/L, the fatty acid tends to be oxidized by oxygen in the culture media, resulting in the reduced plant activation activity. In this context, dissolved oxygen levels are values detected by using PO electrodes by a diaphragm galvanic electrode method or diaphragm polarographic method using a dissolved oxygen meter from HORIBA, Ltd.

The dissolved oxygen concentration in the context of the present invention may be adjusted according to, for example, a culture vessel, shaking speed, and an aeration volume.

The culture condition in the step for fatty acid metabolism in the context of the present invention may be a similar condition as any of conventional conditions applied for culturing the conventional aerobic bacteria, other than the dissolved oxygen concentration, which is, in the present invention, within the predetermined range. Exemplary conditions include for instance a culturing method wherein an aerating cultivation is employed for 3 to 7 days by shaking a culture flask, or using a spinner flask or jar fermentor.

Preferably, the culture period may be a period during which, for example, an emulsification or a decomposition of the fatty acid is sufficiently employed, however, the culture period can be altered according to the shaking condition or amount of microorganisms to be employed. In this context, preferably the end point of the step for fatty acid metabolism is determined by detecting the degree of decomposition of fatty acid from, for example, the absorbance at wavelength 230 nm, thin layer chromatography (TLC), high performance liquid chromatography (HPLC), gas chromatography—mass spectrometry (GC-MS), or liquid chromatography—mass spectrometry (LC-MS).

The temperature in the step for fatty acid metabolism in the context of the present invention may be adapted according to the proteobacteria to be used, and the step is preferably performed under the condition of the temperature of 10 to 40° C., more preferably 20 to 30° C. in terms of fatty acid metabolism efficiency.

The fatty acid and proteobacteria described herein in the context of plant activator of the present invention can be adapted for the fatty acid and proteobacteria for the step for fatty acid metabolism in the context of the present invention.

In this context, a step for pre-culturing proteobacteria is not particularly limited, and may be any conventional methods for culturing aerobic bacteria. Preferably, after the preculture, only the proteobacterial cells may be collected by, for example, centrifugation, and subjected to the step for fatty acid metabolism.

Preferably, in terms of the fatty acid metabolism efficiency and the handleability, the plant activator obtainable from a manufacturing method of the present invention includes a biosurfactant in addition to the fatty acid metabolite, so that the fatty acid as well as the fatty acid metabolite become water soluble. In this context, the biosurfactant according to the present invention is a surfactant produced by proteobacteria.

The plant activator of the present invention may be obtained as a culture solution which is a mixture of, for example, culture media, substances secreted by proteobacteria containing a biosurfactant, and bacterial cells. This culture solution may be adapted for the plant activator of the present invention as it is or after a removal of bacterial cells from this culture solution by, for example, a centrifugation. Although the culture solution can be used without dilution, preferably the culture solution is used after dilution because it may cause a shrinking of a plant part to which the culture solution is applied due to the osmotic effect caused by an evaporation of solution and a concentration of mineral components at a high temperature. A dilution ratio is not particularly limited unless it provides a desirable effect of the present invention, and preferably it would be 100 to 500 times dilution. In this context, the bacterial cells, once removed from the culture solution, may be cultured again in the culture media containing fatty acid, and then the step for fatty acid metabolism can be repeated.

EXAMPLES

The present invention will be illustrated in detail by way of the Examples below, although the present invention shall be not limited to those specific Examples.
Preparation of Plant Activator for Test
<Pre-Culturing Step>

To 1 L of water in the glass Erlenmeyer flask 20 g of peptone (Difco, enzymatic digest of protein), 1.5 g of magnesium sulfate heptahydrate, and 1.5 g of dipotassium hydrogenphosphate were dissolved, autoclaved at 121° C. for 20 min to render it sterile, and after cooled to room temperature, the suspension containing proteobacterial cells was inoculated. The mouth of the Erlenmeyer flask was sealed with a silicone closure. After inoculation, cells in the flask were cultured at 20° C. for 24 hours with shaking (120 rpm) using Bioshaker (Taitec, BR-23UM). The number of bacterial cells in the culture broth was $5\times10^8$ cells/mL. After the culturing, the culture broth was subjected to the centrifugation at 15,000×g, at temperature of 20° C., isolating the bacterial cells from the culture broth, and then the bacterial cells were collected.
<Fatty Acid Metabolism Step>

To 1 L of sterilized water in the glass Erlenmeyer flask 12 g of linoleic acid (Wako, first grade), 1.5 g of magnesium sulfate heptahydrate, 1.5 g of dipotassium hydrogenphosphate, and the whole amount of the bacterial cells obtained from the pre-culturing step were added. The bacterial cells in the flask were cultured at 20° C. for 4 days with shaking (120 rpm) using Bioshaker (Taitec, BR-23UM) under the condition of a dissolved oxygen concentration of 4 mg/L. The decomposition of linoleic acid was determined through the analysis of the culture broth by measuring the absorbance at wavelength 230 nm using BioSpec-mini spectrophotometer (Shimadzu Scientific Instruments) and by estimating the amount of peroxylipid formation, which is one of the intermediate products from the degradation of linoleic acid. After the culturing, the culture broth containing the bacterial cells was evaluated as a plant activator for test as described below.

Gray Mold Caused by *Botrytis cinerea* in Cucumber Leaves Example 1

Figure 1:
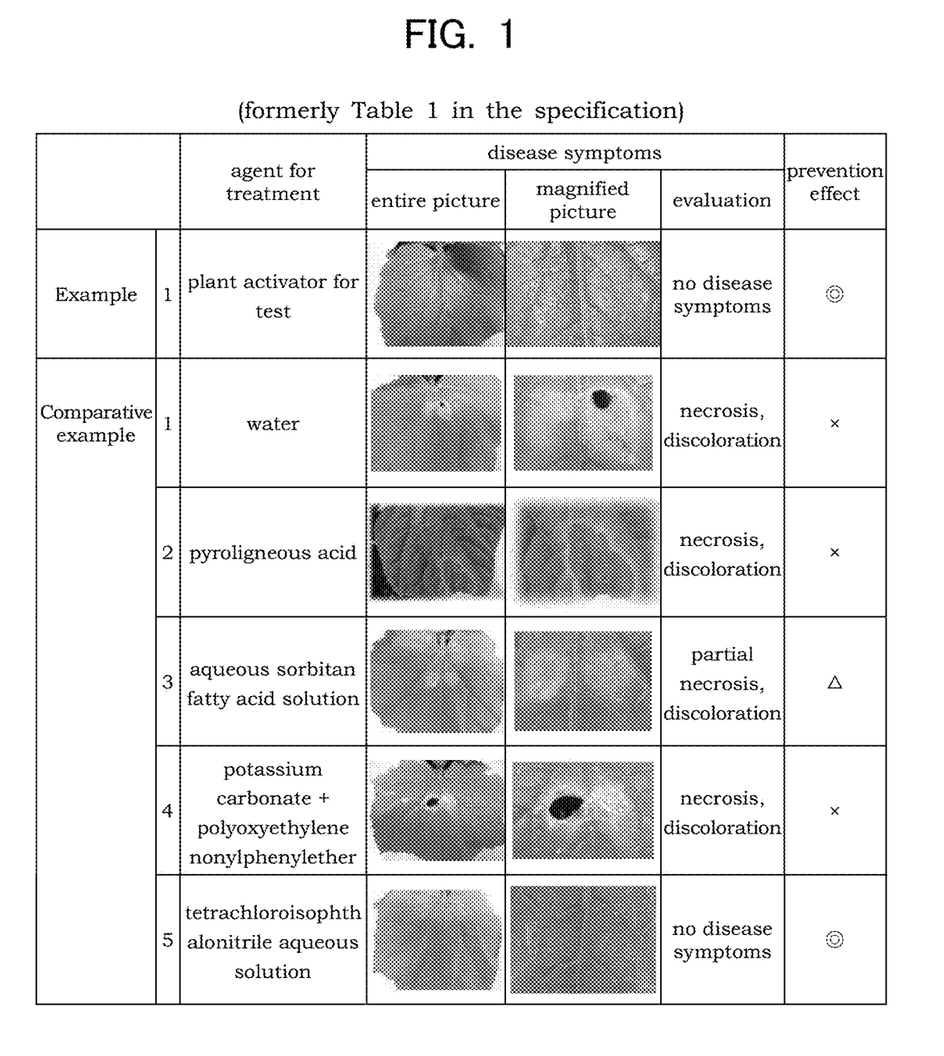
FIG. 1 is a table (formerly "Table 1" in the international phase) that shows test results of the plant activator in an example 1 followed by five comparative examples 1 through 5.

The plant activator for test, which was 500 times diluted with water, was sprayed to the true leaves of cucumber plant grown in the pot. 24 hours after spraying, pathogenic bacteria was inoculated to the spray treated true leaves by making a contact with a filter paper impregnated with *Botrytis cinerea* spore suspension. Then the cucumber plant was grown at 23±2° C. in a high humidity environment for 5 days, and the pathogenic bacteria inoculated part was evaluated. The results are shown in FIG. 1 (formerly Table 1). The prevention effect was determined according to the following criteria.

◉: no disease symptoms
○: disease symptoms such as browning caused by, for example, necrosis was slightly recognized.
Δ: disease symptoms such as browning symptoms caused by, for example, necrosis or yellowing of the whole pathogenic bacteria inoculated part was clearly recognized.
X: browning caused by, for example, necrosis was observed on the whole pathogenic bacteria inoculated part, or the disease symptoms which made a hole at the pathogenic bacteria inoculated part was recognized even though the browning area was not large.

Comparative Examples 1 to 5

The cucumber plants were treated similar to Example 1 except that the water, 500 times diluted pyroligneous acid, 0.04% aqueous sorbitan fatty acid solution, a mixed aqueous solution of 0.2% potassium carbonate and 0.01% polyoxyethylene nonylphenylether, or emulsified 0.08% tetrachloroisophthalonitrile aqueous solution was used instead of the plant activator for test. The results are shown in FIG. 1.

It should be appreciated from the results shown in FIG. 1 (formerly Table 1) that the plant activator of the present invention induces resistance against the gray mold disease in cucumber plants.

*Arabidopsis thaliana* Root

Examples 2 to 4

The roots of *Arabidopsis thaliana* grown in the soil were treated by applying the 10 times, 100 times or 500 times diluted solution of the plant activator for test using the watering. 24 hours after the treatment, bacterial soft rot causing bacteria (*Erwinia carotovora* subsp. *Carotovora*) was inoculated on the leaves and stems above the ground. The plants were then grown at 23±2° C. in a high humidity environment for 3 days, and the disease symptoms at the pathogenic bacteria inoculated part had been evaluated up to one week after. The results are shown in Table 2. The disease prevention effect was determined according to the following criteria.

◉: the ratio of the area of leaves with no disease symptoms out of total area is 1.60 times or greater than the ratio observed in untreated leaves.
○: the ratio of the area of leaves with no disease symptoms out of total area is 1.40 to 1.59 times than the ratio observed in untreated leaves.
Δ: the ratio of the area of leaves with no disease symptoms out of total area is 1.20 to 1.39 times than the ratio observed in untreated leaves.

X: the ratio of the area of leaves with no disease symptoms out of total area is 1.20 times less than the ratio observed in untreated leaves.

Figure 2:
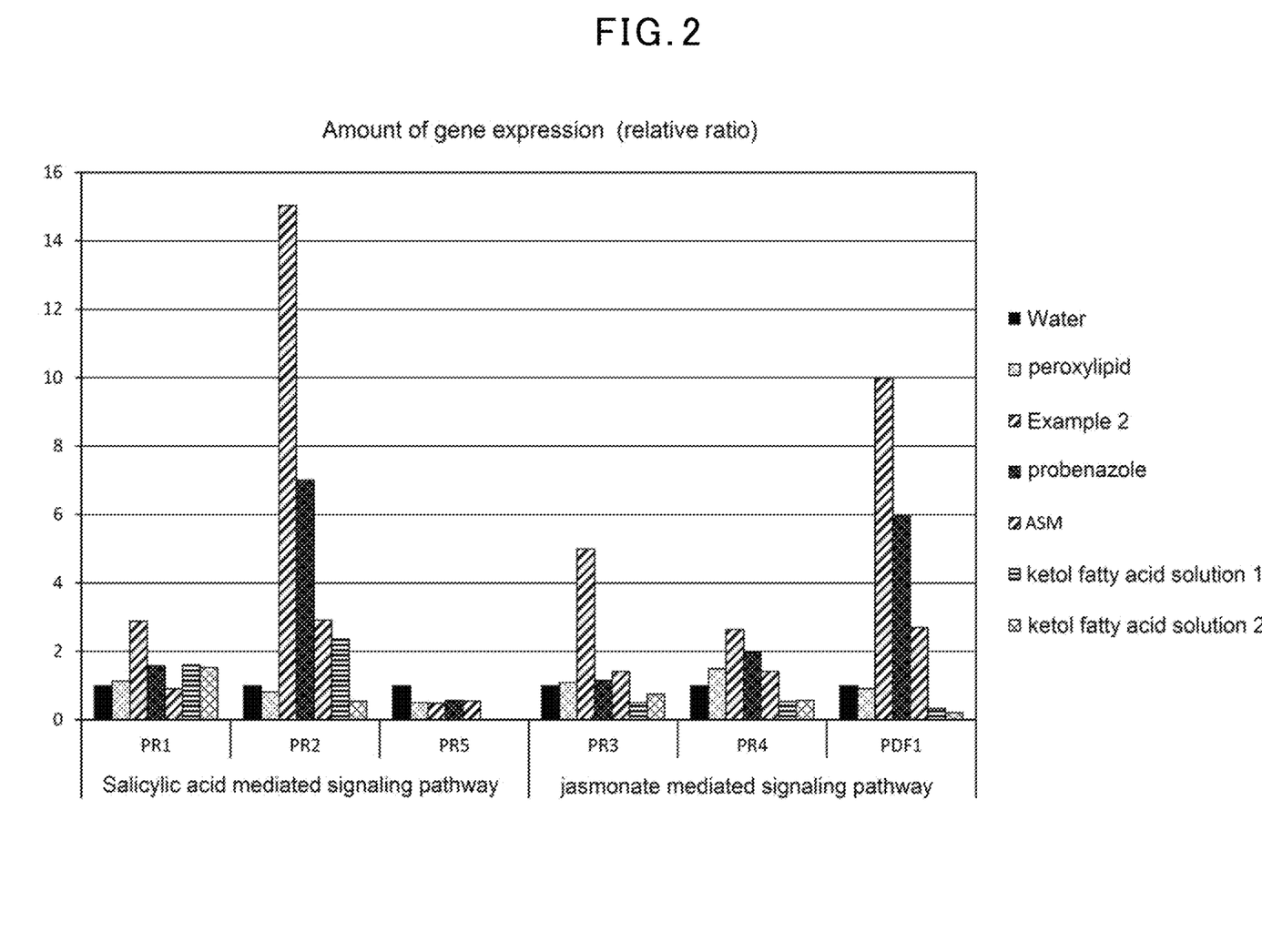
FIG. 2 is a graph showing a gene expression level in *Arabidopsis thaliana*.
Figure 3:
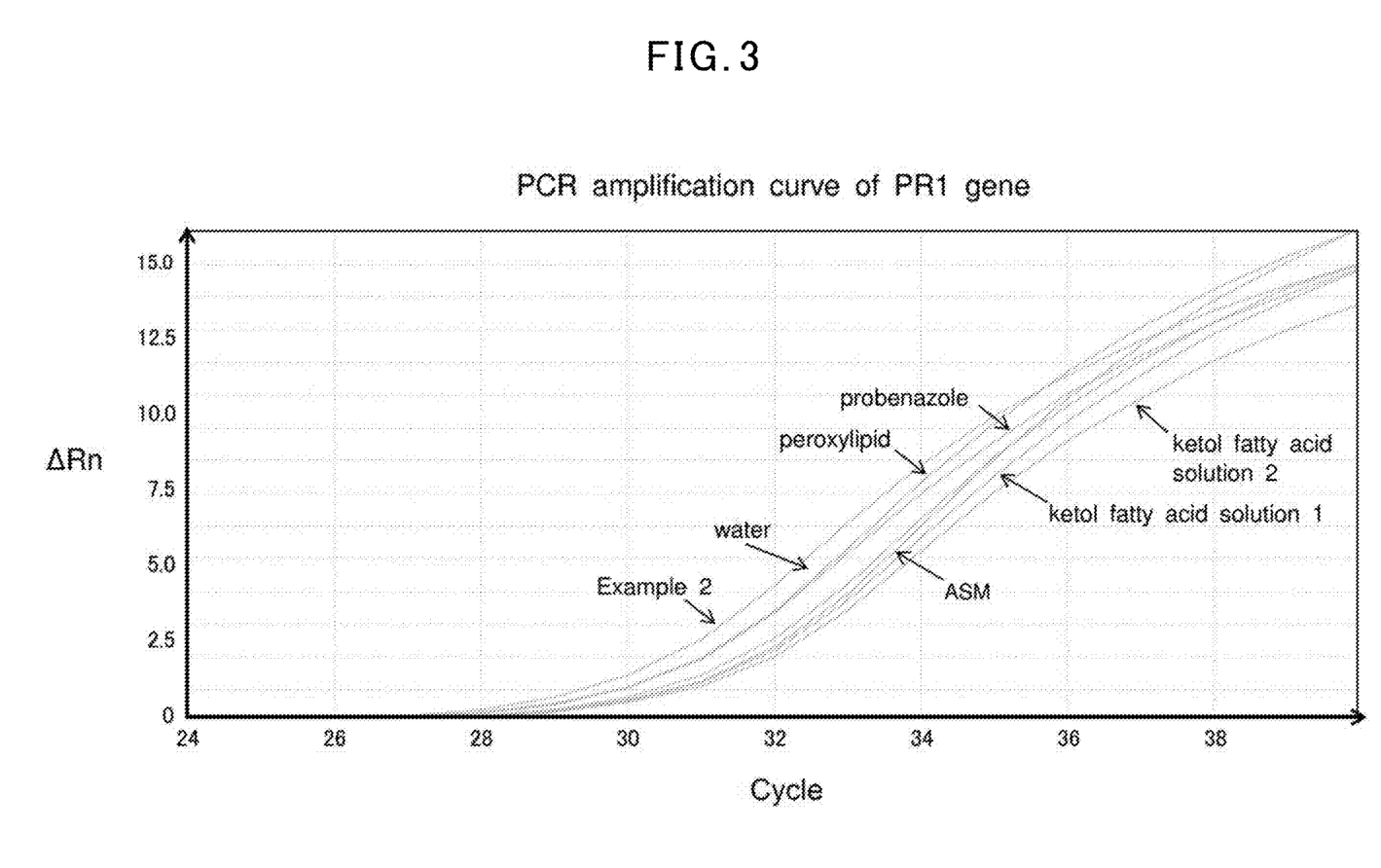
FIG. 3 shows a real-time PCR amplification curve of PR1 gene.

Further, the cDNA was synthesized from total RNA isolated from each *Arabidopsis thaliana* plant 24 hours after treatment, and the expression level of individual genes specific to the salicylic acid mediated signaling pathway and the jasmonate mediated signaling pathway was analyzed by real-time PCR. The gene expression levels were respectively normalized using the house keeping gene as negative control. FIG. 2 shows the expression levels of PR1, PR2 and PR5 genes specific to the salicylic acid mediated signaling pathway and PR3, PR4, and PDF1 genes specific to the jasmonate mediated signaling pathway. FIG. 3 show a real-time PCR amplification curve for PR1.

Comparative Examples 6 to 13

The roots of *Arabidopsis thaliana* were treated similar to Example 2 except that the water, peroxylipid, probenazole, isotianil, acibenzolar-S-methyl (ASM), 3'-chloro-4,4'-dimethyl-1,2,3-thiadiazole-5-carboxianilide (tiadinil), ketol fatty acid solution 1, or ketol fatty acid solution 2 was used instead of the plant activator for test. The results are shown in Table 2.

The peroxylipid used in Comparative example 7 was prepared according to the preparation method described below.

To Erlenmeyer flask 100 mL of distilled water and 1 mL of 32% sodium hydroxide solution were added and stirred with magnetic stirrer, and then heated to 50° C. in water bath. Then 1.2 g of linoleic acid (Wako, first grade), and 0.53 mL of hydrogen peroxide (35%) were added and the reaction mixture was refluxed at 50° C. in water bath at atmospheric pressure for 3 days. The reaction was monitored using a silica gel coated plate (Merck, 60F254 on glass plate), the solvent mixture (chloroform:methanol=10:1) as a developing solvent, and sulfuric acid as coupler. The spots on the glass plate were visualized by a dark spot formed by sulfuric acid. The spot which was visualized by UV light and sulfuric acid just below the spot of the starting material was a spot for peroxylipid, and the reaction was stopped when the formation of peroxylipid was visually observed to reach about 40 to 50% of the starting material. The resulting reaction mixture was neutralized with 5% hydrochloric acid and chloroform was added, and then the chloroform layer was recovered, washed with water and saturated brine using a separatory funnel, and then the resulting chloroform layer was dried over anhydrous sodium sulfate, filtered, and collected, and concentrated and vacuum-dried to obtain linoleic acid oxide in the form of a syrup. The solution to which 0.6 g of resulting linoleic acid oxide, 75 mg of dipotassium hydrogenphosphate, and 75 mg of magnesium sulfate heptahydrate were suspended was used as the peroxylipid.

The ketol fatty acid solution 1 used in Comparative example 12 was prepared according to the preparation method described below.

10 mg of soybean lipoxidase (Sigma) was added to the linoleic acid suspension containing 1 g of linoleic acid, 0.15 g of dipotassium hydrogenphosphate, and 100 mL of distilled water, and the reaction mixture was stirred for 24 hours to form peroxylipid 1. The formation of peroxylipid was identified by TLC comparison with a standard compound (developing solvent of chloroform:methanol=20:1, visualized by sulfuric acid) and by the increase in absorbance at 234 nm. It was also identified by NMR that the main composition in the peroxylipid 1 was 13HPODE ((9Z, 11E)-13-hydroperoxy-9, 11-octadecadienoic acid).

To the resulting peroxylipid 1, 0.1 mg of allene oxide synthase (Sigma-Aldrich) was added and stirred for 24 hours to form ketol fatty acid, and the enzyme reaction was then stopped by adding diluted hydrochloric acid on ice to adjust the pH of reaction mixture to pH 3.0. The solution after whose pH was adjusted to 6.5 was used as ketol fatty acid solution 1.

The ketol fatty acid solution 2 used in Comparative example 13 was prepared according to the preparation method described below.

10 g of maize embryos was grounded in a mortar, and then 30 mL of distilled water was added and the mixture was further grounded in a mortar to make a suspension. The resulting suspension was centrifuged at 16000 rpm for 15 min to obtain a supernatant, and the resulting supernatant was used as a substance containing lipoxygenase from maize embryos. 10 mg of the substance containing lipoxygenase from maize embryos was added to the linoleic acid suspension containing 1 g of linoleic acid, 0.15 g of dipotassium hydrogenphosphate, and 100 mL of distilled water, and the reaction mixture was stirred for 24 hours to form peroxylipid 2. The formation of peroxylipid was identified by TLC comparison with a standard compound (developing solvent of chloroform:methanol=20:1, visualized by sulfuric acid) and by the increase in absorbance at 234 nm. It was also identified by NMR that the main composition in the peroxylipid 2 was 9HPODE ((9S, 10E, 12Z)-9-hydroperoxy-10, 12-octadecadienoic acid).

To the resulting peroxylipid 2, 0.1 mg of allene oxide synthase (Sigma-Aldrich) was added and stirred for 24 hours to form ketol fatty acid, and the enzyme reaction was then stopped by adding diluted hydrochloric acid on ice to adjust the pH of reaction mixture to pH 3.0. The solution after whose pH was adjusted to 6.5 was used as ketol fatty acid solution 2.

TABLE 2

|  |  | agent for treatment | disease prevention |
|---|---|---|---|
| Example | 2 | 10 times diluted solution of plant activator for test | ◉ |
|  | 3 | 100 times diluted solution of plant activator for test | ◉ |
|  | 4 | 500 times diluted solution of plant activator for test | ○ |
| Comparative example | 6 | water | X |
|  | 7 | peroxylipid | Δ |
|  | 8 | probenazole | Δ |
|  | 9 | isotianil | Δ |
|  | 10 | ASM | ◉ |
|  | 11 | tiadinil | X |
|  | 12 | ketol fatty acid solution 1 | X |
|  | 13 | ketol fatty acid solution 2 | X |

From the results shown in Table 2 and FIG. 2, it should be appreciated that the plant activator of the present invention induces resistance against the bacterial soft rot disease in *Arabidopsis thaliana*. Further, it is demonstrated that the amount of gene expression, related to the salicylic acid mediated signaling pathway as well as the jasmonate mediated signaling pathway, in the presence of the plant activator of the present invention is greater than those in the presence of ASM or probenazole.

Leaves and Stems of Tomatoes (Grown in Pot)

Example 5

The leaves and stems of tomatoes (cultivar "Momotaro") grown in the pot for 3 weeks were treated by applying 10 mL of undiluted solution of the plant activator for test using the watering. The soil (about 100 g) in the pot was moistened thoroughly before the watering. The bacterial wilt disease bacteria were inoculated on the leaves and roots of tomatoes 1 hour and 24 hours after the watering. The plants were then grown at 30° C. in a high humidity environment for 7 days, and the incidences of the bacterial wilt disease and phytotoxic damage were evaluated. The results are shown in Table 3.

Further, the cDNA was synthesized from total RNA isolated from each tomato 24 hours and 72 hours after the inoculation, and the expression level of individual genes specific to the salicylic acid mediated signaling pathway and the jasmonate mediated signaling pathway was analyzed by real-time PCR. In this example, the amount of the gene expression is represented by an index, which is a calculated ratio given that the amount of gene expression in untreated tomatoes is 1. The results are shown in Table 3.

Comparative Examples 14 and 15

The leaves and stems of tomatoes were treated similar to Example 5 except that the water and the fatty acid (linoleic acid) were used instead of the plant activator for test. The results are shown in Table 3.

TABLE 3

|  |  | agent for treatment | incidences of disease | incidences of phytotoxic damage | salicylic acid mediated signaling pathway 24 hours | salicylic acid mediated signaling pathway 72 hours | jasmonate mediated signaling pathway 24 hours | jasmonate mediated signaling pathway 72 hours |
|---|---|---|---|---|---|---|---|---|
| Example | 5 | plant activator for test | 50% | 0% | 11.0 | 7 | 3 | 3.5 |
| Comparative example | 14 | untreated | 100% | 0% | 1 | 1 | 1 | 1 |
| Comparative example | 15 | fatty acid | 100% | 0% | 0 | 0 | 0.5 | 1 |

It should be appreciated from the results shown in Table 3 that the plant activator of the present invention induces resistance against the bacterial wilt disease in tomatoes without causing any phytotoxic damages. Further, it is demonstrated that the amount of gene expression related to the salicylic acid mediated signaling pathway as well as the jasmonate mediated signaling pathway is high.

Leaves and Stems of Tomatoes (Growing in Farm Field)

Tomato (cultivar "Reika") seedlings were planted with space of 60 cm between plants in the farm field where an outburst of bacterial wilt disease was observed, and the solution of the plant activator for test, which was 50 times diluted with water, was applied either by spraying (20 mL/plant) or watering it to soil (200 mL plant) once every week. The incidences of the bacterial wilt disease and phytotoxic damage were evaluated once every week for 4 weeks. The results are shown in Table 4.

Comparative Examples 16 and 17

The leaves and stems of tomatoes were treated similar to Example 6 except that the Validamycin or no agent was used instead of the plant activator for test. The results are shown in Table 4.

TABLE 4

|  |  | agent for treatment | incidences of disease | | | | incidences of phytotoxic damage | | | |
|---|---|---|---|---|---|---|---|---|---|---|
|  |  |  | Week 1 | Week 2 | Week 3 | Week 4 | Week 1 | Week 2 | Week 3 | Week 4 |
| Example | 6 | plant activator for test | 0% | 0% | 0% | 33% | 0% | 0% | 0% | 0% |
| Comparative example | 16 | untreated | 0% | 0% | 42% | 75% | 0% | 0% | 0% | 0% |
| Comparative example | 17 | Validamycin | 0% | 0% | 0% | 67% | 100% | 100% | 100% | 100% |

It should be appreciated from the results shown in Table 4 that the plant activator of the present invention induces resistance against the bacterial wilt disease in tomatoes without causing any phytotoxic damages.

Leaves and Stems of Miniature Roses (in a Planter)

Example 7

The solution of the plant activator for test, which was 100 times diluted with water, was applied to the leaves and stems of miniature roses (cultivar Rouge) planted in an outdoor planter right after the planting and once every week by spraying (about 50 mL/plant), and the naturally occurring damages due to disease (powdery mildew and black point disease) were evaluated on first week and fourth week. The results are shown in Table 5.

Comparative Examples 18 and 19

The leaves and stems of miniature roses were treated similar to Example 7 except that 0.02% mepanipyrim or no agent was used instead of the plant activator for test. The results are shown in Table 5.

TABLE 5

| | | | incidences of disease | | | |
|---|---|---|---|---|---|---|
| | | agent for treatment | powdery mildew | | black point disease | |
| | | | Week 1 | Week 4 | Week 1 | Week 4 |
| Example | 7 | plant activator for test | 12.5% | 20.8% | 0% | 0% |
| Comparative example | 18 | untreated | 29.1% | 25.0% | 0% | 0% |
| | 19 | mepanipyrim | 20.0% | 30.0% | 0% | 15% |

It should be appreciated from the results shown in Table 5 that the plant activator of the present invention induces resistance against the powdery mildew and black point disease in miniature roses.

Leaves and Stems of Miniature Roses (in a Pot)

Examples 8 to 10

The solution of the plant activator for test, which was 10 times, 100 times or 500 times diluted with water, was applied to the leaves and stems of miniature roses (cultivar Rouge) grown in a pot right after the planting and one week after, two weeks after, and three weeks after by spraying (about 50 mL/plant), and then the plants were transferred to a sealed box inside which a wet paper towel was put and grown under a high humidity condition. One week after the naturally occurring damages due to disease (gray mold disease) were evaluated based on the disease prevention rate in comparison with that in the untreated, comparative section. The results are shown in Table 6.

TABLE 6

| | | agent for treatment | disease prevention rate |
|---|---|---|---|
| Example | 8 | 10 times diluted solution of plant activator for test | 100% |

TABLE 6-continued

| | | agent for treatment | disease prevention rate |
|---|---|---|---|
| | 9 | 100 times diluted solution of plant activator for test | 89% |
| | 10 | 500 times diluted solution of plant activator for test | 100% |

It should be appreciated from the results shown in Table 6 that the plant activator of the present invention induces resistance against the gray mold disease in miniature roses.

Promoting Turf Growth (Germination Rate)

Example 11

The wet filter paper was put on the petri dish and 30 of Western turf seeds were arranged at regular intervals on the wet filter paper. The solution of the plant activator for test, which was 500 times diluted with water, was injected into the filter paper, and plants were incubated with a cover closed at 20±2° C. using 16 hours under plant growing light irradiation and 8 hours of darkness cycle repeatedly, and then, at day 3 and day 5 the germination rates of lateral root ware evaluated. The results are shown in Table 7.

Comparative Example 20

The Western turf seeds were treated similar to Example 11 except that the water was used instead of the plant activator for test. The results are shown in Table 7.

TABLE 7

| | | agent for treatment | germination rate | |
|---|---|---|---|---|
| | | | Day 3 | Day 5 |
| Example | 11 | plant activator for test | 53% | 80% |
| Comparative example | 20 | water | 27% | 47% |

It should be appreciated from the results shown in Table 7 that the plant activator of the present invention promotes the germination of Western turf.

Promoting Turf Growth (Growth of Leaves and Stems)

Examples 12 to 14

To the 72 seed cell tray the culture soil for planting was put, and the turf seeds were placed and lightly covered with the red clay soil which had been grounded in mortar and sieved. The cell tray was put in the stainless container and water was poured into the container up to about 1 cm depth to provide a bottom-watering tray. Plants were incubated at 20±2° C. using 16 hours under plant growing light irradiation and 8 hours of darkness cycle repeatedly. Water was supplied when the water at the bottom of the container was used up completely. After the germination was observed in each seed cell, plants were spray-treated by spraying the solution of the plant activator for test, which was 10 times, 100 times or 500 times diluted with water, to each cell (5 mL per cell), and the length of the leaves and stems growth in 14 days were measured and evaluated. The results are shown in Table 8.

Comparative Example 21

The turf seeds were treated similar to Example 12 except that the water was used instead of the plant activator for test. The results are shown in Table 8.

TABLE 8

| | agent for treatment | length of leaves (cm) | | | |
|---|---|---|---|---|---|
| | | Day 7 | Day 10 | Day 12 | Day 14 |
| Example | 12 10 times diluted solution of plant activator for test | 3.0 | 5.1 | 5.7 | 6.2 |

TABLE 8-continued

| | agent for treatment | length of leaves (cm) | | | |
|---|---|---|---|---|---|
| | | Day 7 | Day 10 | Day 12 | Day 14 |
| | 13 100 times diluted solution of plant activator for test | 3.8 | 4.8 | 5.2 | 5.7 |
| | 14 500 times diluted solution of plant activator for test | 2.8 | 4.1 | 4.6 | 5.5 |
| Comparative example | 21 water | 2.5 | 3.5 | 3.9 | 5.1 |

It should be appreciated from the results shown in Table 8 that the plant activator of the present invention promotes the leaves and stems growth of Western turf.

Promoting Eggplant Growth

Example 15

17 Eggplant seedlings (root stock: *Solanum integrifolium*; scion: *Solanum melongena* L. cultivar "Senryo"), which had been grown up to or over 15 cm in pot, were planted with space of 60 cm between plants, and a chemical fertilizer, a mixed fertilizer, and an organic fertilizer were applied accordingly as a basal fertilizer, in addition to an additional fertilizer. The solution of the plant activator for test, which was 50 to 100 times diluted with water, was applied to the plants right after the planting and once every week by spraying (about 20 to 50 mL/plant) and by watering (about 100 to 300 mL/plant). Then, once every week the fruits which were grown to 15 cm or more were harvested and the number of the harvested fruits was evaluated. All eggplant plants were pruned to three main branches, and the main stem length had been measured and evaluated from one week after the planting. The results are shown in Table 9.

Figure 4:
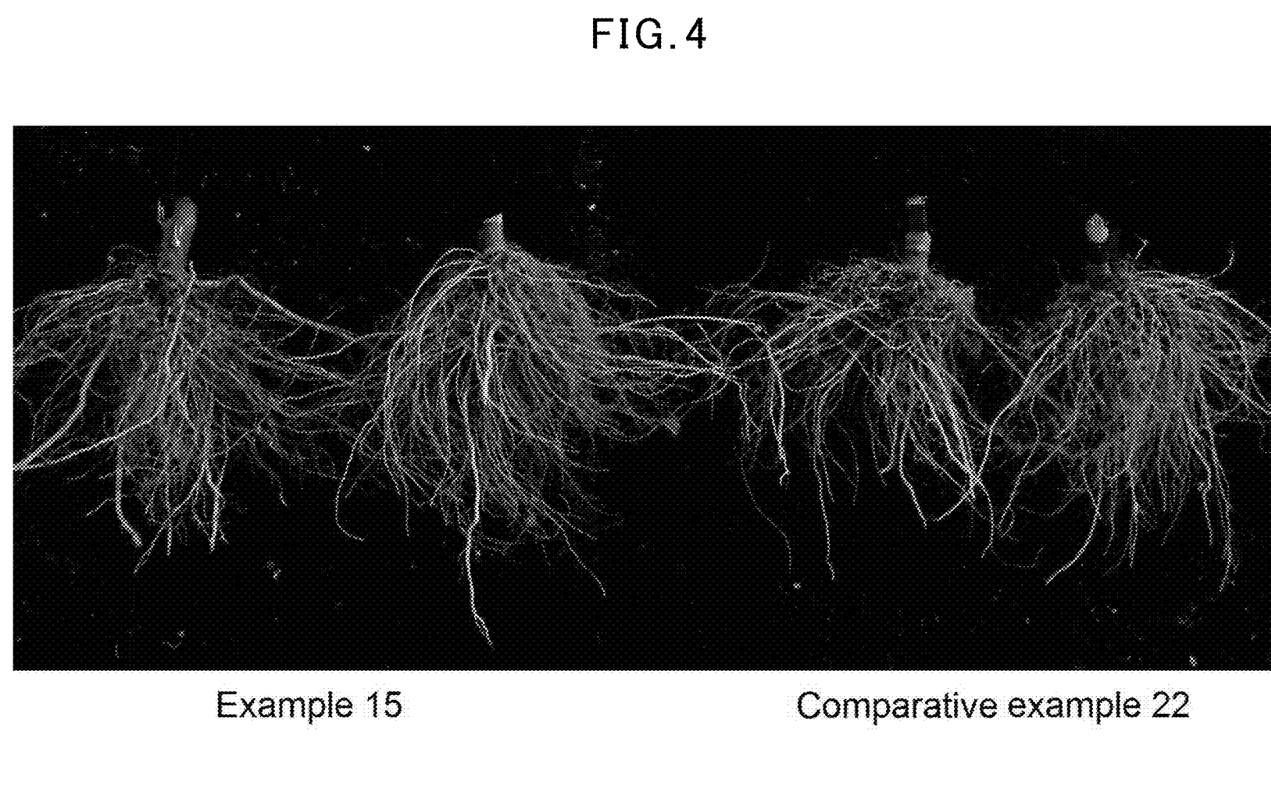
FIG. 4 is a picture showing a result of a growth-promoting activity in eggplant root.
Figure 5:
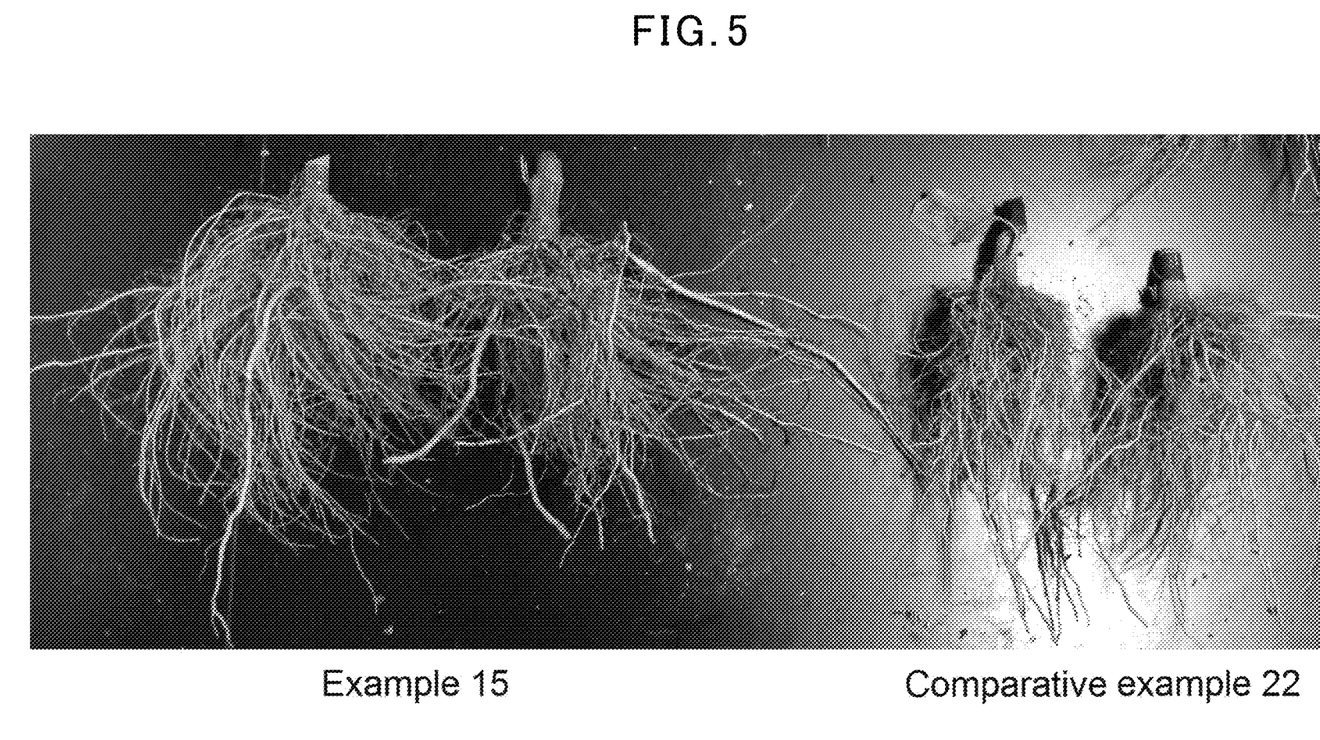
FIG. 5 is a picture showing a result of a growth-promoting activity in eggplant root.

Further, after 2 to 3 months after the planting, the ridge was watered adequately to soften the soil, and then the plants were pulled out from the soil while loosening the soil covering the roots. After pulling the plant, the plant was cut at 1 cm above ground level, and the root side was washed with water, dried for one day at room temperature, and then dried in thermostatic drier (SANYO Electric Co., Ltd., MOV-112U) at 60° C. for 24 hours, and the dried weight was weighed using an electronic balance (Shimadzu Scientific Instruments, UX220H). The measurement results obtained for optionally selected three plants are shown in FIGS. 3 and 4.

Comparative Example 22

The eggplant seedlings were treated similar to Example 15 except that the no treatment was applied. The results are shown in Tables 9 and 10, and FIGS. 3 and 4.

TABLE 9

| | agent for treatment | average length of main stem (cm) | | | | | number of the harvested fruits per plant | | | | |
|---|---|---|---|---|---|---|---|---|---|---|---|
| | | Week 1 | Week 2 | Week 3 | Week 4 | Week 5 | Week 1 | Week 2 | Week 3 | Week 4 | Week 5 |
| Example | 15 plant activator for test | 35.8 | 47.2 | 54.3 | 65.2 | 76.2 | 0.9 | 0.2 | 0.6 | 0.8 | 2.0 |
| Comparative example | 22 untreated | 35.6 | 45.5 | 51.7 | 58.4 | 70.4 | 0.9 | 0.1 | 0.5 | 0.5 | 0.9 |

TABLE 10

| | agent for treatment | dried weight (g) | | | average | standard deviation |
|---|---|---|---|---|---|---|
| Example | 15 plant activator for test | 11.606 | 10.476 | 8.163 | 10.08 | 1.755 |
| Comparative example | 22 untreated | 6.313 | 5.721 | 6.561 | 6.20 | 0.4316 |

It should be appreciated from the results shown in Tables 9 and 10, and FIGS. 3 and 4 that the plant activator of the present invention promotes the eggplant growth.

The above described results show that the plant activator of the present invention and the plant activator obtainable by the manufacturing method of the present invention have superior resistance-inducing activity and growth promoting activity and low toxicity and soil contamination.

The invention claimed is:

1. An agent effective in gene expression comprising a fatty acid metabolite obtainable by a metabolism of fatty acid with 4 to 30 carbon atoms by a proteobacteria under a dissolved oxygen concentration of 4 to 8 mg/L, wherein the gene expression in a salicyclic acid mediated signaling pathway and/or a jasmonate mediated signaling pathway is effective in a plant.

2. The agent effective in gene expression of claim 1, wherein the fatty acid is a liquid fatty acid at a temperature of 20° C.

3. The agent effective in gene expression of claim 1, wherein the proteobacteria is a proteobacteria pre-cultured to $1\times10^8$ to $9\times10^{10}$ cells/mL.

4. The agent effective in gene expression of claim 1, wherein the metabolism is a metabolism in the presence of at least one mineral selected from Mg, P, Na and K.

5. The agent effective in gene expression of claim 1, wherein the agent for gene expression comprises a biosurfactant.

6. The agent effective in gene expression of claim 1, wherein the metabolism is a metabolism under a condition of temperature ranging from 10 to 40° C.

7. The agent effective in gene expression of claim 1, wherein the agent for gene expression induces resistance against a rot disease.

8. The agent effective in gene expression of claim 1, wherein the agent for gene expression induces resistance against a wilt disease in solanaceous plants.

9. A method for manufacturing an agent for gene expression comprising a fatty acid metabolite, comprising a step for fatty acid metabolism wherein a fatty acid with 4 to 30 carbon atoms is subjected to a proteobacterial metabolization under a dissolved oxygen concentration of 4 to 8 mg/L, wherein the gene expression in a salicyclic acid mediated signaling pathway or a jasmonate mediated signaling pathway is effective in a plant.

10. The method for manufacturing the agent for gene expression of claim 9, wherein the fatty acid is liquid at a temperature of 20° C.

11. The method for manufacturing the agent for gene expression of claim 9, wherein the proteobacteria is a proteobacteria pre-cultured to $1 \times 10^8$ to $9 \times 10^{10}$ cells/mL.

12. The method for manufacturing the agent for gene expression of claim 9, wherein the step for fatty acid metabolism is performed in the presence of at least one mineral selected from Mg, P, Na and K.

13. The method for manufacturing the agent for gene expression of claim 9, wherein the agent of gene expression comprises a biosurfactant.

14. The method for manufacturing the agent for gene expression of claim 9, wherein the step for fatty acid metabolism is performed under a condition of temperature ranging from 10 to 40° C.

15. The method for manufacturing the agent for gene expression of claim 9, wherein the agent of gene expression serves as a resistance-inducing agent.

16. The method for manufacturing the agent for gene expression of claim 9, wherein the agent of gene expression serves as a prophylactic agent for a wilt disease in solanaceous plants.

* * * * *